(12) United States Patent
Divelbiss et al.

(10) Patent No.: US 6,943,852 B2
(45) Date of Patent: Sep. 13, 2005

(54) SINGLE CELL LIQUID CRYSTAL SHUTTER GLASSES

(75) Inventors: Adam W. Divelbiss, Wappingers Falls, NY (US); David C. Swift, Cortlandt Manor, NY (US)

(73) Assignee: Inventqjaya Sdn Bhd, Cyberjaya (MY)

( * ) Notice: Subject to any disclaimer, the term of this patent is extended or adjusted under 35 U.S.C. 154(b) by 0 days.

(21) Appl. No.: 10/140,702

(22) Filed: May 7, 2002

(65) Prior Publication Data

US 2002/0163600 A1 Nov. 7, 2002

Related U.S. Application Data

(60) Provisional application No. 60/289,095, filed on May 7, 2001.

(51) Int. Cl.[7] .......................... G02F 1/1335; G02F 1/13; G01C 3/14
(52) U.S. Cl. .............................. 349/13; 349/15; 349/96; 349/200; 356/12
(58) Field of Search .............................. 349/13, 15, 96, 349/200; 356/12

(56) References Cited

U.S. PATENT DOCUMENTS

| | | | |
|---|---|---|---|
| 4,884,876 A | 12/1989 | Lipton et al. | 350/347 |
| 4,967,268 A | 10/1990 | Lipton et al. | 358/92 |
| 5,117,302 A | 5/1992 | Lipton | 359/227 |
| 5,181,133 A | 1/1993 | Lipton | 359/84 |
| 5,402,191 A * | 3/1995 | Dean et al. | 352/63 |
| 5,572,250 A | 11/1996 | Lipton et al. | 348/43 |
| 5,821,989 A | 10/1998 | Lazzaro et al. | 348/56 |
| 6,061,043 A * | 5/2000 | Bonnett et al. | 345/89 |
| 6,088,052 A | 7/2000 | Guralnick | 348/51 |
| 6,278,501 B1 | 8/2001 | Lin | 349/13 |
| 6,295,065 B1 | 9/2001 | Tettington | 345/419 |
| 6,359,664 B1 | 3/2002 | Faris | 349/15 |

FOREIGN PATENT DOCUMENTS

| | | | |
|---|---|---|---|
| EP | 0892563 A2 | 1/1999 | H04N/13/00 |
| JP | 2000284224 | 10/2000 | G02B/27/26 |
| WO | WO 98/54614 | 12/1998 | G02C/7/12 |
| WO | WO 01/25836 A2 | 4/2001 | G02C/5/00 |

OTHER PUBLICATIONS

International Search Report, PCT/US02/14554, mailed Aug. 21, 2002.

* cited by examiner

Primary Examiner—Tarifur R. Chowdhury
Assistant Examiner—Hoan Chau Nguyen

(57) ABSTRACT

The invention is a stereoscopic shutter system having a single liquid crystal (LC) cell. The system may have flexible substrates or non-flexible substrates. The system requires only two electrical conductors to shutter both eyes. The system uses twisted nematic liquid crystal, ferro-electric liquid crystal, pi-cell technology, or other similar shuttering technologies. The system includes only one LC cell, a single large laminated linearly polarizing filter P1, and two smaller linear polarizing analyzers oriented in the P1 and P2 states. The shutters may be bent into a one-dimensional curved shape about the vertical or horizontal axis.

8 Claims, 3 Drawing Sheets

OFF State

ON State

Twisted Nematic Liquid

Twisted Nematic Liquid

SINGLE CELL LIQUID CRYSTAL SHUTTER GLASSES

This application claims the benefit of provisional application No. 60/289,095, filed May 07, 2001.

BACKGROUND OF THE INVENTION

This invention relates to the field of stereoscopic viewing and in particular to the use of single cell liquid crystal shutter glasses.

Typical Liquid Crystal (LC) shutter glasses are composed of two separate liquid crystal shutters that open and closed in an alternating pattern that is synchronized to the command of an image display system. Further, current systems use LC cells that are constructed from glass substrates that are non-flexible and limit the range of designs achievable for the glasses. The present invention offers a new approach to the construction of LC shutter glasses by using a single flexible LC cell as the active element. The advantages of the present invention over prior art include a simpler drive scheme requiring only two wires, lower cost due to a single larger LC cell, a flexible substrate allowing simple curvature of the shutter for a broader range of design, and lighter weight due to the elimination of the glass substrates. Previous patents and applications by, Faris, Lazzaro, Divelbiss, Swift, Guralnick, Lipton, and Tettington have fixed field of view LC filters. The time-multiplexed technique for viewing electronic stereoscopic images is now a standard viewing modality for computer graphics and video. During the past decade, electro-stereoscopic displays have become a well-established means for viewing images.

All of these systems use liquid crystal ("LC") shuttering eyewear for viewing stereoscopic images are described in the following patents and patent applications: U.S. Pat. No. 4,884,876 entitled "Achromatic Liquid Crystal Shutter For Stereoscopic And Other Applications;" U.S. Pat. No. 4,967, 268entitled "Liquid Crystal Shutter System For Stereoscopic And Other Applications;" U.S. Pat. No. 5,117,302 entitled "High Dynamic Range Electro-Optical Shutter For Stereoscopic And Other Applications;" U.S. Pat. No. 5,181, 133 entitled "Drive Method For Twisted Nematic Liquid Crystal Shutters For Stereoscopic And Other Applications; U.S. Pat. No. 5,463,428 entitled "Wireless Active Eyewear For Stereoscopic Applications;" ; High Dynamic Range Electro-optical Shutter For Stereoscopic And Other Applications; U.S. Pat. No. 5,572,250 entitled "Universal Electronic Stereoscopic Display and WO 98/54614 entitled "Electrostereocopic Eyewear." Additional patents describing LC shutter glasses include: U.S. Pat. No. 5,821,989 entitled "Stereoscopic 3-D View System and Glasses Having Electro-optical Shutters Controlled By Control Signals produced by Using Horizontal Pulse Detection Within the Vertical Synchronization Pulse Period of Computer Generated Video Signals"; U. S. Pat. No. 6,295,065 entitled Method and Apparatus To Alternate Stereoscopic Images In a Video Display Device"; U.S. Pat. No. 6,088,052 entitled "3D Stereoscopic Video Display System"; U.S. Pat. No. 6,278,501 entitled Three Dimensional Liquid Shutter Glasses"; U.S. Pat. No. 6,359,664 entitled Electro-optical Display System For Visually Displaying Polarized Spatially Multiplexed Images of 3-D Objects for Use In Stereoscopically Viewing The Same With High Quality and High Resolution; and WO 01/25836 entitled 3D Shutter Glass and Line Blanker System. All of the above patents and patent applications are hereby incorporated by reference.

LC shuttering eyewear for the mass consumer market must be manufactured at the lowest possible cost of goods in order to compete in what is essentially a commodity marketplace. Therefore, there is a need for a shutter glass system that has lower cost, simplicity of design and a flexible substrate that allows for broader range of glasses designs.

SUMMARY OF THE INVENTION

The invention is a stereoscopic shutter system having a single liquid crystal (LC) cell. The system may have flexible substrates or non-flexible substrates. The system requires only two electrical conductors to shutter both eyes. The system uses twisted nematic liquid crystal, ferro-electric liquid crystal, pi-cell technology, or other similar shuttering technologies. The system includes only one LC cell, a single large laminated linearly polarizing filter P1, and two smaller linear polarizing analyzers oriented in the P1 and P2 states. The shutters may be bent into a one-dimensional curved shape about the vertical or horizontal axis.

DETAILED DESCRIPTION OF THE INVENTION

Figure 1:
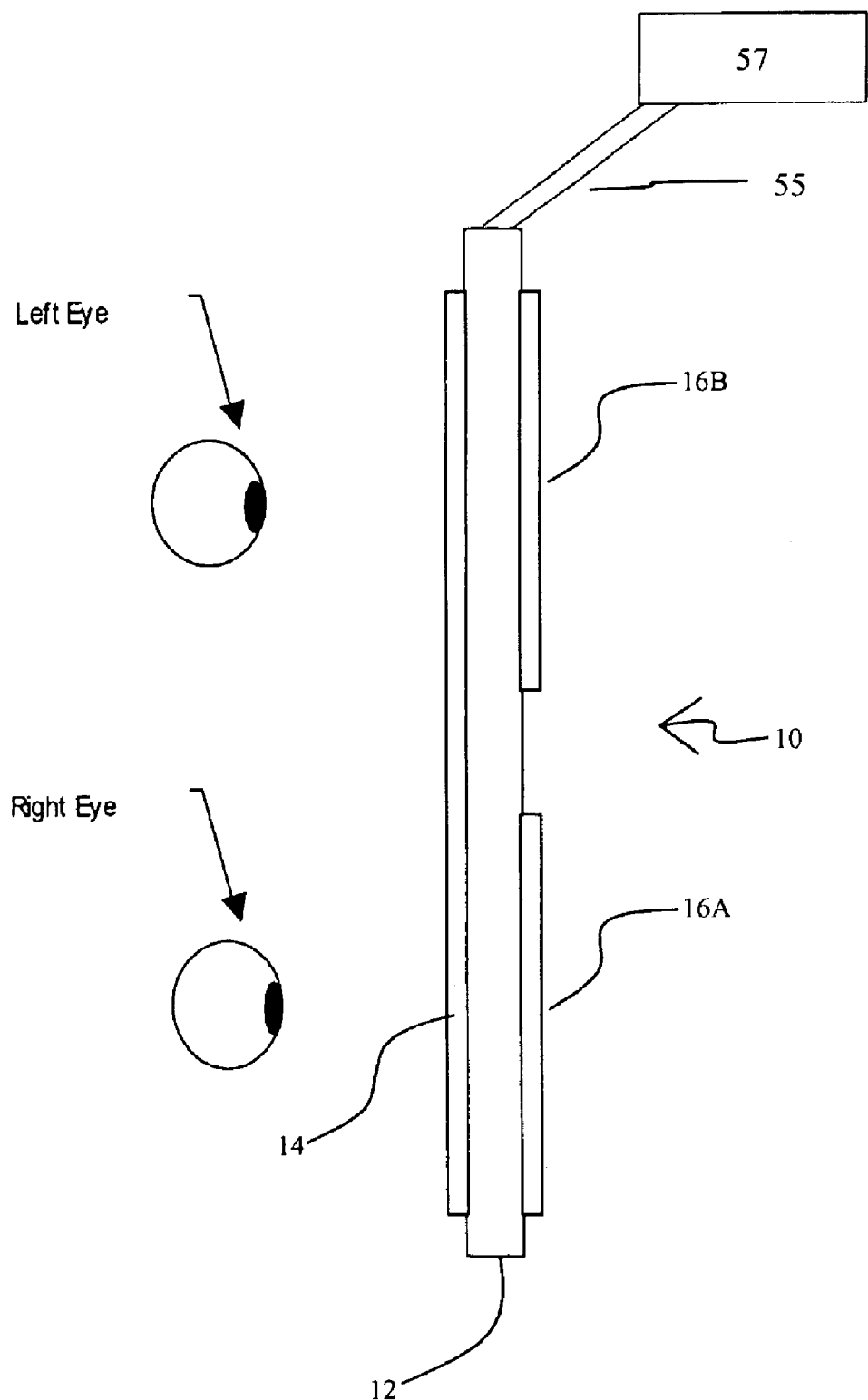
FIG. 1 illustrates a top view of a single cell LC stereoscopic shutter system.

FIG. 1 illustrates a top view of the compound liquid crystal shutter assembly 10. The LC cell itself may be constructed from any of the various methods known to the art including twisted nematic, Ferro-electric, and pi-cell, etc.. The LC cell is constructed using a flexible substrate 12 to allow bending of the cell in one dimension. One side of the shutter assembly 10 is a laminated with a linear polarizing film designated P1. The other side is laminated with two separate linearly polarizing films that correspond to each eye 16A and 16B One film 16A is oriented such that its polarization axis is parallel to P1. The other film 16B is oriented such that its polarization axis is perpendicular to P1 and known as P2. A simplified control system 57 is electrically coupled to the LC cell 12 by means of a pair of wires 55. The order of the elements relative to the viewer's eye is not critical.

Figure 2:
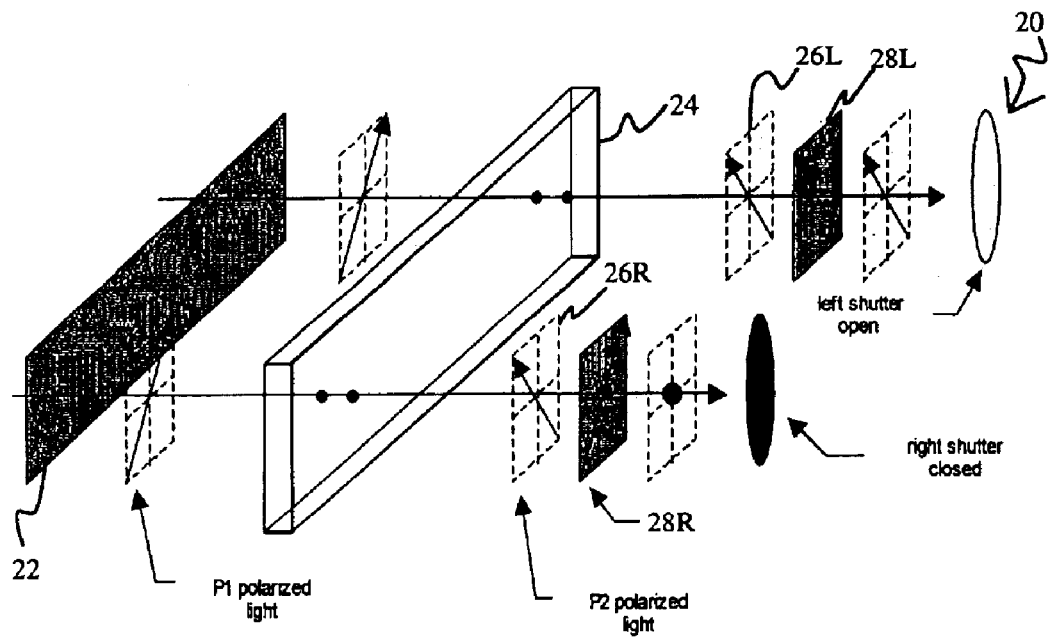
FIG. 2 illustrates a single cell LC shutter operational diagram for a cell in its OFF state.

FIG. 2 illustrates an operational diagram of the compound LC shutter system 20 in which the LC cell 24 is in the off state. This is the case when no electric field is applied to the LC cell 24. In this case, light entering from the left passes through the P1 linear polarizing film 22. Linearly polarized light with a polarization angle of 45 degrees then passes through the LC cell 24 in the off state. Since the cell is OFF, the polarization angle of the light is rotated by 90 degrees to +45 degrees as shown by diagrams 26L and 26R. Next light that enters the P1 analyzer (output polarizing film) 28R is blocked since the polarization angle of the light is now perpendicular to the P1 state. Contrariwise, light entering the P2 analyzer 28L passes through since the polarization angle of the light is parallel to the P2 state. Note: We will refer the optical components associated with the left eye as the left element and the optical components associated with the right eye as the right element.

Figure 3:
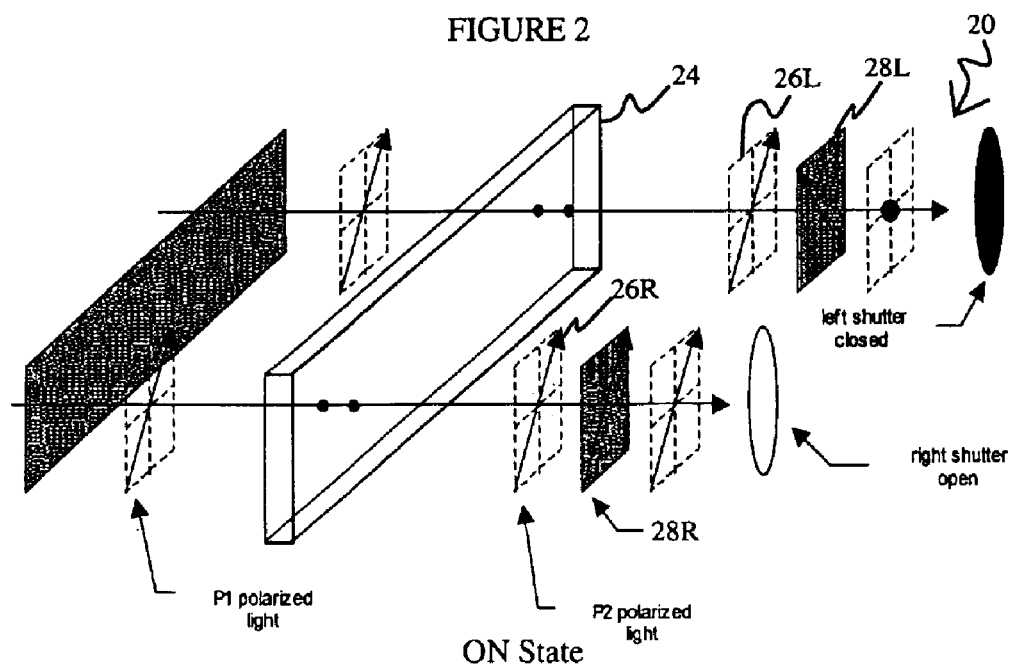
FIG. 3 illustrates a single cell LC shutter operational diagram for a cell in the ON state.

FIG. 3 shows an operational diagram of the compound LC shutter 20 in which the cell itself is in the ON state. This is the case in which an electric field is applied to the LC cell. In this case, light entering from the left passes through the P1 linear polarizing film 22. Linearly polarized light with a polarization angle of −45 degrees then passes through the LC cell 24 in the off state. Since the cell is ON the polarization angle of the light is not rotated and remains in the P1 state. Next light that enters the P1 analyzer 28R (output polarizing film) is passed since the polarization angle of the light is parallel to the P1 state. Contrariwise, light entering the P2 28L analyzer is blocked since the polarization angle of the light is perpendicular to the P2 state.

FIGS. 2 and 3 illustrate one configuration of the system where the P2 filter is associated with the viewer's right eye. The system can also be setup so that the P2 filter is associated with the viewer's left eye.

Most LC shutter glass systems require separate control lines for each eye path since each eye path has a separate switching element. The present invention only requires the switching of a single LC cell. Therefore a simplified control system is utilized and that requires only a single pair of wires from the control system (not shown). The switching is controlled by electronics of the display system and is well known in the art. Several such systems are described in the disclosures discussed above.

One of the benefits of a single cell using a single drive system is that the user can easily determine if the glasses are not enabled because one of the elements will be dark (either the left element or the right element). In dual cell systems, when no power is applied, both cells are typically clear which can be easily confused with the active shuttering mode that also looks mostly clear.

It is also possible to achieve a mostly clear state for both elements (useful for viewing non 3D stereoscopic data) by shuttering the LC cell at a high frequency so that no flicker is perceived.

Figure 4:
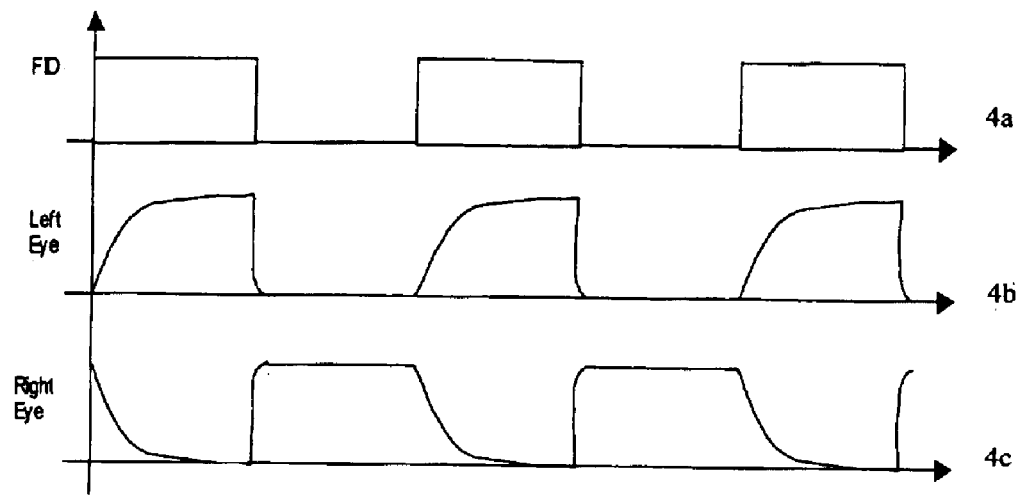
FIG. 4 illustrates a typical shutter response for a twisted nematic liquid crystal based system.

FIG. 4 shows a typical optical response plot for the present invention implemented with a flexible twisted nematic LC cell. FIG. 4a illustrates the exciting voltage to the shutter mechanism. In this case, the cell is OFF with the left eye observes light and the cell is ON when the right eye observes light. The OFF to ON transition shown in FIGS. 4b and 4c illustrates the slow response typical for TN cells.

Figure 5:
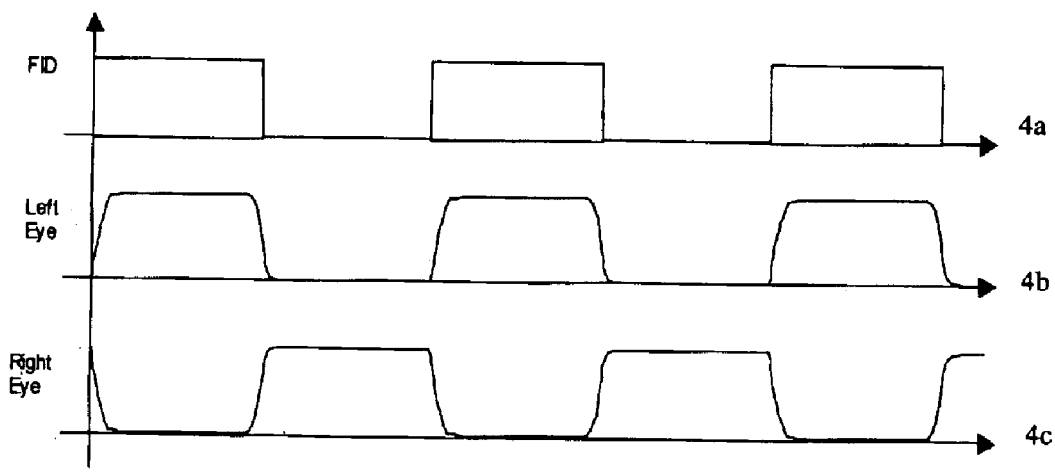
FIG. 5 illustrates a typical optical shutter response for a ferro-electric liquid crystal based system.

FIG. 5 shows a typical optical response plot for the present invention implemented with a flexible Ferro-electric LC cell. FIG. 5a again illustrates the switching voltage. In this case, the cell is OFF with the left eye observes light and the cell is ON when the right eye observes light. The plot illustrates in FIGS. 5b and 5c show the typically faster response and more symmetric transitions of the Ferro-electric LC cell.

The present invention has been described with reference to the above illustrative embodiments. It us understood, however, modifications to the illustrative embodiments will readily occur to persons with ordinary skill in the art. All of such modifications and variations are deemed to be within the scope and spirit of present invention as defined by the accompanying claims.

What is claimed is:

1. A stereoscopic shutter system comprising:

only one LC cell composed of one or more flexible substrates, said one LC cell switchable with a single switching voltage;

a first single laminated linearly polarizing filter with polarization axis P1 disposed on one surface of said one LC cell; and an additional pair of linear polarizing filters oriented in the P1 and P2 states disposed on an opposing surface of said one LC cell, said P1 and P2 being orthogonal to each other, said pair of linear polarizing filters disposed so that Pl is in line with a user's first eye end P2 is in line with a user's second eye.

2. The system of claim 1 wherein a first portion of said pair having its polarization axis parallel to P1 and located in line with a user's first eye;

a second portion of said pair having a polarization axis P2, wherein the P2 axis is perpendicular to P1 and located in line with a user's second eye.

3. The system of claim 1 further comprising:

means for controlling an Off and On state of said LC cell.

4. The system of claim 3 wherein only two conductors are required to shutter both eyes.

5. The system of claim 1 wherein said LC cell comprises twisted nematic liquid crystal.

6. The system of claim 1 wherein said LC cell comprises ferro-electric liquid crystal.

7. The system of claim 1 wherein said LC cell comprises pi-cell technology.

8. The system of claim 2 wherein said shutter is bent into a one-dimensional curved shape about the vertical or horizontal axis.

* * * * *